May 16, 1933.　　　　　J. H. DURST　　　　　1,909,034
BRAKE
Filed July 22, 1930　　　2 Sheets-Sheet 1

Joseph H Durst
INVENTOR
ATTORNEY

May 16, 1933.  J. H. DURST  1,909,034
BRAKE
Filed July 22, 1930   2 Sheets-Sheet 2

Joseph H Durst
INVENTOR

ATTORNEY

Patented May 16, 1933

1,909,034

UNITED STATES PATENT OFFICE

JOSEPH H. DURST, OF PORTLAND, OREGON

BRAKE

Application filed July 22, 1930. Serial No. 469,677.

My invention is intended for use as an expanding brake, primarily adapted for placement upon a motor vehicle. It has for its primary purpose and object the placing of a plurality of shoes upon the internal brake structure of motor vehicles adapted for being actuated externally, as from a foot pedal, to cause each of the brake shoe elements to expand and thereby contact with the inner surface of the brake drum.

The invention in its preferred embodiment consists of a housing, a drum disposed upon the outer periphery of the housing, a plurality of brake shoes hingedly disposed within the housing with a gear segment hinged relative to the housing and to which one end of each of the brake segments are hingedly disposed. The oppositely disposed end of the brake segment is adapted for having an in and out movement imparted thereto as the gear segment is manipulated. An annular gear coacts with the gear segments and is adapted for manipulating the same as a rotary movement is imparted to the annular gear. The annular gear is partially rotated by a bell crank having a gear segment disposed thereupon that is adapted for coacting with the annular gear to partially rotate the same.

Heretofore it has been the general practice in internal expanding brakes to form the brake shoes of two units and to expand the same by a common actuator. The fault of this construction consists in providing a structure that results through continued use in the wearing off of the brake lining upon one end of the brake shoe in advance of the total destruction of the brake lining secured to the brake shoe. Through the use of my new and improved device a more uniform expansion of the brake shoes is accomplished because of the fact that the brake shoes are made of shorter units and due to the further fact that the entire shoe is outwardly extended when the brake is actuated.

In the drawings I have shown brake shoes composed of three units, but I do not wish to be limited to three units only as in the larger sizes a larger number of units may be placed within the brake drum housing.

The object of my invention is to give a more efficient braking construction.

A still further object of my invention consists in providing a brake construction that will be more efficient in its operation and will have a greater longevity.

A still further object of my invention consists in providing a construction that may be used over relatively long periods with freedom from mechanical annoyances.

Still further objects of my invention consist in providing a construction composed of relatively few parts and that will produce an efficient braking service being developed for practically the full inner periphery of the braking drum.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 4 is a perspective, side view of one of the braking segments shown removed from the housing.

Fig. 5 is a perspective, side view, of one of the gear segments shown removed from the housing.

Like reference characters refer to like parts throughout the several views.

Figure 1:
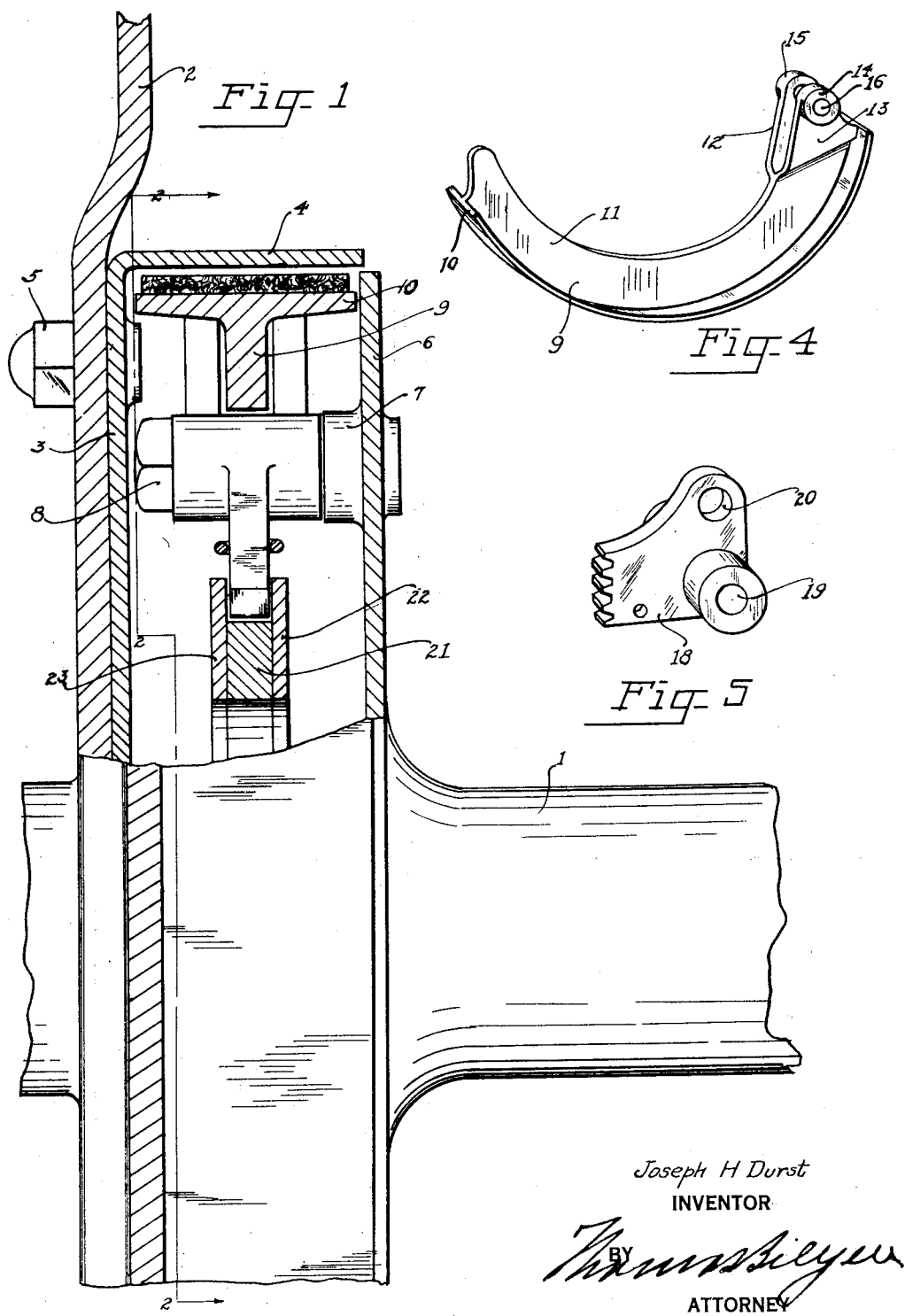
Fig. 1 is an edge view of the braking drum, shown partially in section and illustrating a part of the flanged wheel and axle to which the same is adapted.
Figure 2:
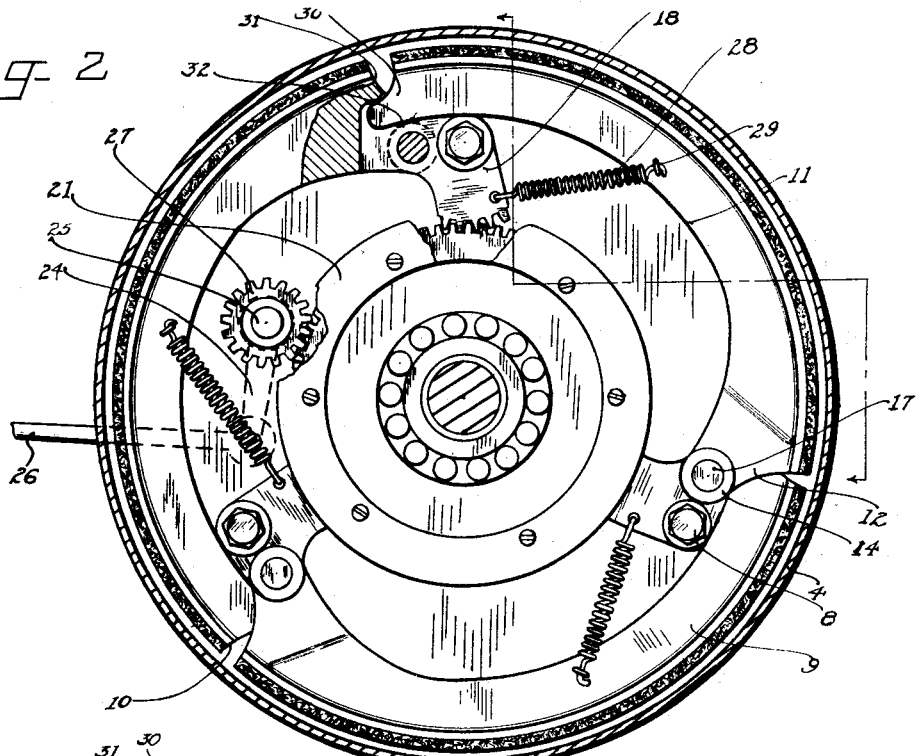
Fig. 2 is a sectional side view of the assembled device, the same being taken on line 2—2 of Fig. 1 looking in the direction indicated. In this view the brake shoes are shown in normal inactive position.
Figure 3:
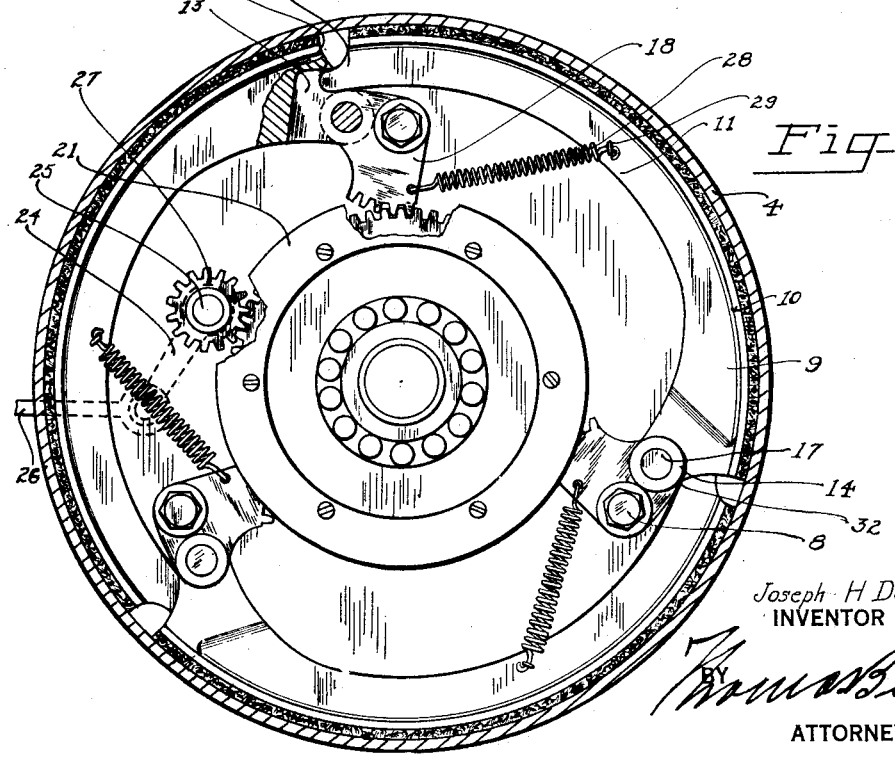
Fig. 3 is a sectional, side view of the mechanism shown in Fig. 2, in which position the brake shoes are shown in expanded operative condition.

1 is the axle and 2 is the disc portion of the wheel. 3 is the brake drum housing. 4 is the brake drum. The brake drum is secured to the disc portion 2 of the wheel by any suitable fastening means as by bolts 5. A closure plate 6 is fixedly positioned upon the axle and to which the same is held in placement by any suitable means as by being made integral with the axle itself. Bosses 7 are disposed upon the closure plate 6, the same being preferably formed integral therewith and being disposed upon the outer and inner surface of the closure plate 6 and in registerable alignment with each other. A fastening journal bolt 8 is secured to the respective bosses and to the closure plate. A plurality of brake shoes 9, here shown as three in number, are disposed within the brake drum. The brake shoes preferably being made as having a band 10 disposed upon its outer periphery and having a rib 11 running entirely around the band and inwardly extending therefrom. The rib is furcated to form two supporting jaws 12 and 13 upon its one end with bosses 14 and 15 disposed upon the outer surface of the same through which a bolt hole 16 passes, a journal pin 17 passing therethrough. A gear segment 18 is journaled relative to the housing by the bolt 8 passing through a hole 19 that runs transversely of the gear segment body element. A second hole 20 is disposed through the body element and parallelly to the hole 19 through which the bolt 8 passes. An annular gear 21 is floating within the housing. Flanges 22 and 23 are disposed upon either side of the annular gear. The annular gear coacts with the gear segments and the flanges 22 and 23 engage the oppositely disposed sides of the gear segments and hold the same in place. An arm 24 is hingedly journaled about a pin 25 that is secured to the housing and the actuating rod 26 is hingedly journaled and leads from the arm to the lever, or foot control, that actuates the same. A pinion 27 is disposed upon the hub of the arm 24 and the teeth of the same coact with the annular gear and partially rotate the annular gear as the arm 24 is manipulated. Each of the gear segments are normally held in reacted position through a reacting element, as a spring 28. The spring 28 is secured upon its one end to the gear segment and upon its oppositely disposed end to a hook 29, disposed upon the rib of the brake shoe. When the brake shoes are assembled within the brake drum a bearing surface is disposed between the floating end 30 of the brake shoe and the end 31 of the adjacent brake shoe and a working fit is maintained between the camming surface 32 of the gear segment and the floating end of the brake shoe so that each end of the brake shoe is outwardly extended as the gear segments are rockably positioned through the movement that is imparted to the annular gear.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, in combination with a brake drum, a closure plate fixedly positioned relative to the drum, an annular gear disposed centrally within the drum, a plurality of gear segments journaled to the closure plate and adapted to coact with the annular gear, reacting means for maintaining the gear segments under tension, a like number of brake shoes movably disposed within the drum, each of said brake shoes having one of their ends journaled to one of the gear segments and having their oppositely disposed end ride upon the next succeeding brake shoe, and means for actuating the assembly.

2. Apparatus as in claim 1 wherein the gear segments have a cam surface upon which the free ends of the brake shoes ride and to which the oppositely disposed ends of the brake shoes are journaled.

3. Apparatus as in claim 1 wherein the means for actuating the assembly includes a pinion adapted to coact with the annular gear and an arm secured to the pinion.

4. In a device of the class described, in combination with a brake drum, a closure plate fixedly positioned relative to the drum, an annular gear disposed centrally of the drum, a plurality of brake shoes movably disposed within the drum and about the annular gear, a plurality of gear segments directly aligned with the annular gear journaled to the closure plate, said gear segments and one end of each of the brake shoes being rockably journaled to each other, each of said brake shoes having a rib centrally thereof, a bifurcated end and a cam surfaced end, each of the bifurcated ends being journaled to one of the gear segments, and each of the cam surfaced ends being adapted to ride between the furcation created by the bifurcated end of the brake shoes so that as the gear segments are rocked both the journaled end of one of the brake shoes and the cam surfaced end of the preceding brake shoe will be moved simultaneously.

JOSEPH H. DURST.